(12) United States Patent
Van Horne et al.

(10) Patent No.: US 8,352,592 B2
(45) Date of Patent: Jan. 8, 2013

(54) CONTROLLING EMISSION OF EVENTS FROM MANAGED SYSTEMS TO EXTERNAL MANAGEMENT SYSTEMS

(75) Inventors: Peter Van Horne, San Diego, CA (US); Edwin Van Horne, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 296 days.

(21) Appl. No.: 12/758,701

(22) Filed: Apr. 12, 2010

(65) Prior Publication Data

US 2011/0252126 A1    Oct. 13, 2011

(51) Int. Cl.
*G06F 15/173* (2006.01)
(52) U.S. Cl. .......................... 709/224; 714/47.1; 714/48
(58) Field of Classification Search ................. 709/223, 709/224; 714/47.1, 48
See application file for complete search history.

(56) References Cited

U.S. PATENT DOCUMENTS

| | | | | |
|---|---|---|---|---|
| 6,748,432 B1* | 6/2004 | Du et al. | ........................ | 709/224 |
| 6,990,601 B1* | 1/2006 | Tsuneya et al. | ................ | 714/4.5 |
| 7,313,613 B1* | 12/2007 | Brooking et al. | ............ | 709/223 |
| 7,337,222 B1* | 2/2008 | Du et al. | ........................ | 709/223 |
| 7,945,817 B1* | 5/2011 | Usery et al. | ..................... | 714/48 |
| 8,041,799 B1* | 10/2011 | Usery et al. | ..................... | 709/223 |
| 8,166,352 B2* | 4/2012 | Harnois | .......................... | 714/57 |
| 8,255,525 B2* | 8/2012 | Martin et al. | ................. | 709/224 |
| 2004/0139193 A1* | 7/2004 | Refai et al. | .................... | 709/224 |
| 2005/0222810 A1* | 10/2005 | Buford et al. | ................. | 702/183 |
| 2005/0222811 A1* | 10/2005 | Jakobson et al. | ............. | 702/183 |
| 2005/0222895 A1* | 10/2005 | Jakobson et al. | ............... | 705/10 |
| 2005/0228763 A1* | 10/2005 | Lewis et al. | ........................ | 706/1 |
| 2007/0140133 A1* | 6/2007 | Gudipalley et al. | ........... | 370/242 |
| 2007/0204030 A1* | 8/2007 | Mimura et al. | ................ | 709/223 |
| 2009/0048998 A1* | 2/2009 | Kaminsky et al. | .............. | 706/47 |
| 2010/0107179 A1* | 4/2010 | Quintanilla et al. | .......... | 719/318 |
| 2010/0228849 A1* | 9/2010 | Moore et al. | .................. | 709/224 |
| 2010/0332918 A1* | 12/2010 | Harnois | .......................... | 714/57 |

OTHER PUBLICATIONS

Banerjee et al., "A Framework for Distributed Monitoring and Root Cause Analysis for Large IP Networks," Reliable Distributed Systems, 2009. SRDS '09. 28th IEEE International Symposium, p. 246-255.*

* cited by examiner

*Primary Examiner* — Oanh Duong
(74) *Attorney, Agent, or Firm* — Hickman Palermo Truong Becker Bingham Woong LLP (57) ABSTRACT

In an embodiment, an apparatus comprises one or more processors and a computer-readable storage medium storing one or more sequences of instructions which, when executed by the processors, cause the processors to perform generating relationship information based on relationships between one or more events that are generated by one or more managed systems. The computer-readable storage medium further comprises instructions which, when executed, cause sending the relationship information to the managed systems, wherein the relationship information allows the managed systems to determine whether reporting of the events, by the managed systems, should be suppressed; and receiving, from one or more managed systems, a report about an event when reporting of the event cannot be suppressed.

23 Claims, 7 Drawing Sheets

CONTROLLING EMISSION OF EVENTS FROM MANAGED SYSTEMS TO EXTERNAL MANAGEMENT SYSTEMS

TECHNICAL FIELD

The present disclosure generally relates to communications between managed network infrastructure systems, such as routers and switches, and external management systems.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An aggregate system may include one or more external management systems and one or more managed systems. Managed systems monitor the operations performed by components of the managed systems, while external management systems oversee the operations performed by the managed systems. Managed systems may also generate status and statistical information about the operations performed by the managed systems, and communicate the information to external management systems for control and monitoring.

Event data can represent status information communicated from a managed system to an external management system including managed system status, status of components, and performance data for the managed system or components. Often, event data is voluminous, and collecting and communicating a large amount of event data by managed systems may impede performance. Vast event data amassed and transmitted within the aggregate system may inhibit system functionality, stall access to system resources, and hamper operations that rely on availability of system resources.

A managed system could select and report only the most important events. However, this approach requires the managed system to decide which events are important. Some managed systems may not have enough resources to perform both system primary tasks and to determine which events are important. Inconsistency in event reporting also may occur if managed systems use different criteria in determining which events are important. This approach also precludes the external management system from deciding which events should be reported. If a managed system evaluates importance of the events independently from the external management system, the external management system may receive event information that is either incomplete or unnecessary. For example, the external management systems may receive incomplete information about the events that are important, but unnecessary information about the events that are unimportant.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Examples of Aggregate Systems
3.0 Examples of Relationships Between Events
4.0 Examples of Conditions
5.0 Process of Controlling Emission of Events
6.0 Implementation Mechanisms—Hardware Overview
7.0 Extensions and Alternatives 1.0 General Overview In an embodiment, an apparatus comprises one or more processors and a computer-readable storage medium storing one or more sequences of instructions. The apparatus may also comprise an event processing logic that is coupled to the processors, and is configured to send and receive one or more units of information.

In an embodiment, the computer-readable storage medium stores one or more sequences of instructions which, when executed by the one or more processors, cause the processors to perform generating relationship information based on relationships between one or more events that are generated by one or more managed systems and that may be captured by the event processing logic. Examples of the relationships between two or more events include, but are not limited to, any of: a containment relationship, an association relationship, a parent-child relationship, a sequentially ordered relationship, a weighted relationship, an AND relationship, an OR relationship, a compound relationship, a member-of relationship and a NOT-member-of relationship.

In an embodiment, the computer-readable storage medium further comprises instructions which, when executed, cause sending the relationship information to the managed systems. The relationship information helps the managed systems to determine whether reporting of the events, by the managed systems, should be suppressed.

In an embodiment, the computer-readable storage medium further comprises instructions which, when executed, cause receiving, from a managed system, a report about an event, after the managed system determined that reporting of the event s cannot be suppressed.

In an embodiment, the computer-readable storage medium further comprises instructions which, when executed, cause generating one or more event reporting modes that are associated with the events, and sending, to the managed systems, the event reporting modes. Examples of the event reporting modes include, but are not limited to, any of: never report, always report, and conditionally report.

In an embodiment, the computer-readable storage medium further comprises instructions which, when executed, cause generating one or more event enable-disable characteristics that are associated with the events, and sending, to the managed systems, the event enable-disable characteristics. Examples of the event enable-disable characteristics include, but are not limited to, any of: enable reporting and disable reporting.

In an embodiment, the computer-readable storage medium further comprises instructions which, when executed, cause generating one or more event asynchronous-synchronous characteristics that are associated with the events, and sending, to the managed systems, the event asynchronous-synchronous characteristics. Examples of the event asynchronous-synchronous characteristics include, but are not limited to, any of: asynchronous and synchronous.

In an embodiment, a method is performed by one or more processors and comprises generating relationship information based on relationships between one or more events that are generated by one or more managed systems and that are captured by an event processing logic.

In an embodiment, the method further comprises sending the relationship information to the managed systems, wherein the relationship information allows the managed systems to determine whether reporting of the events, by the managed systems, should be suppressed.

In an embodiment, the method further comprises receiving, from a managed system, a report about an event, after the managed system determined that reporting of the event cannot be suppressed.

2.0 Examples of Aggregate Systems

Figure 1:
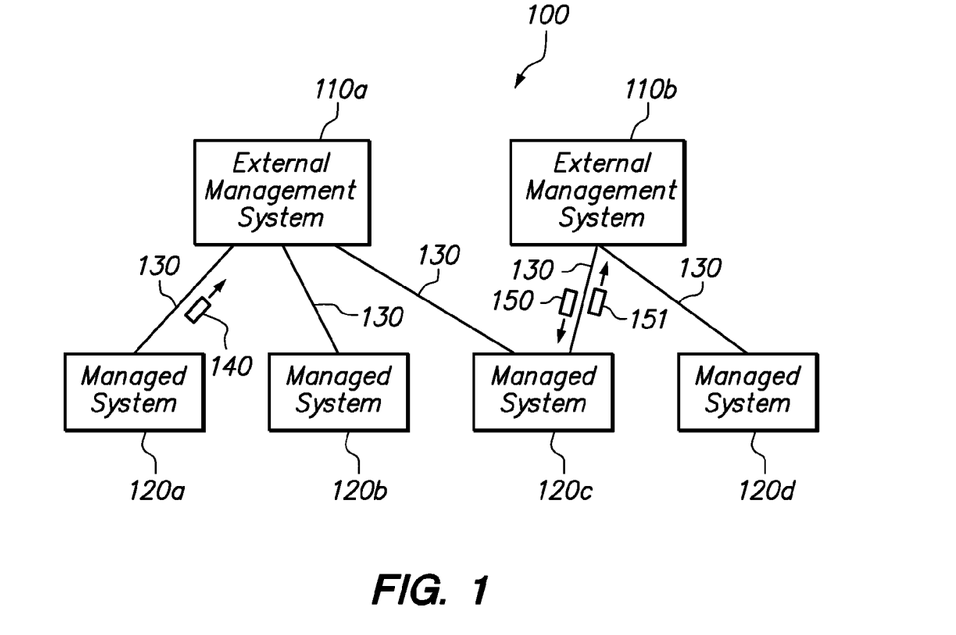
FIG. 1 illustrates an embodiment of an aggregate system comprising external management systems and managed systems.
Figure 2:
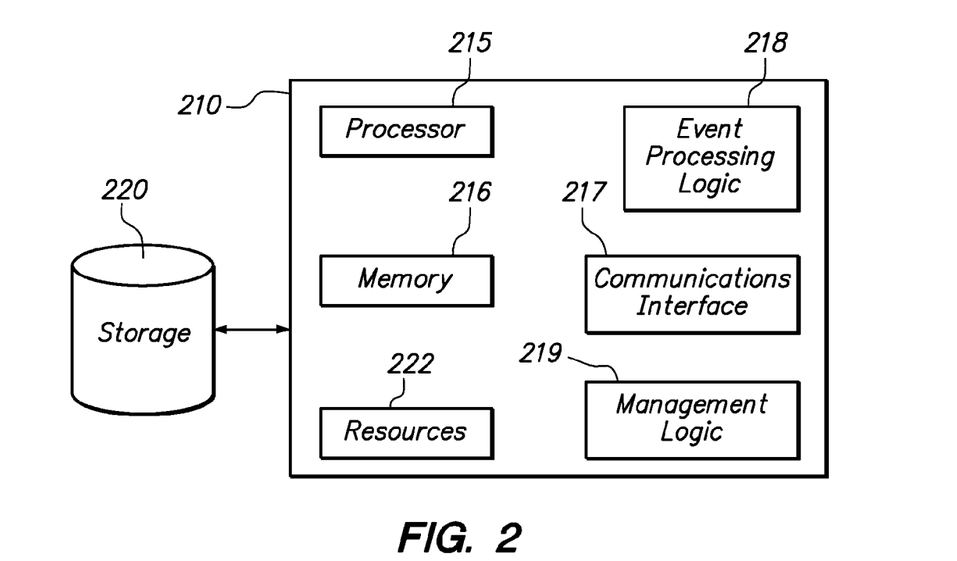
FIG. 2 illustrates an embodiment of an external management system.
Figure 3:
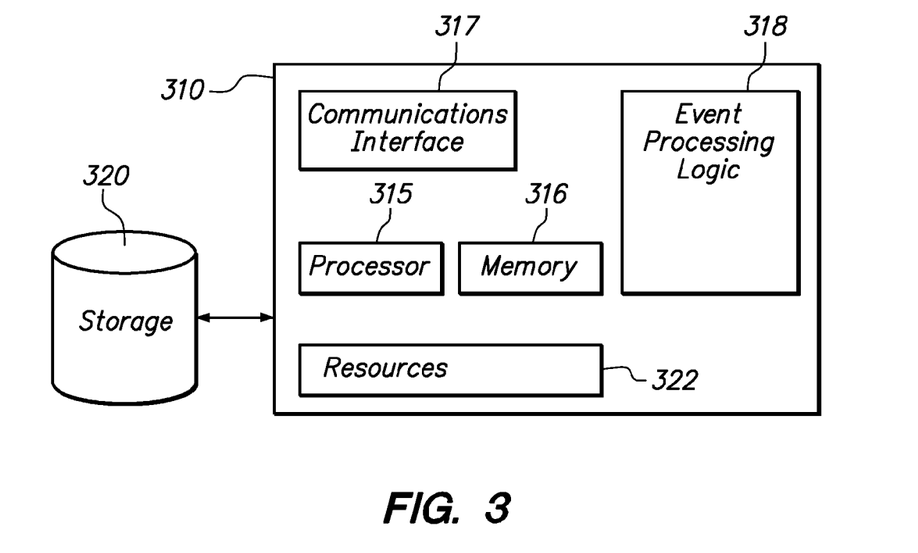
FIG. 3 illustrates an embodiment of a managed system.
Figure 4:
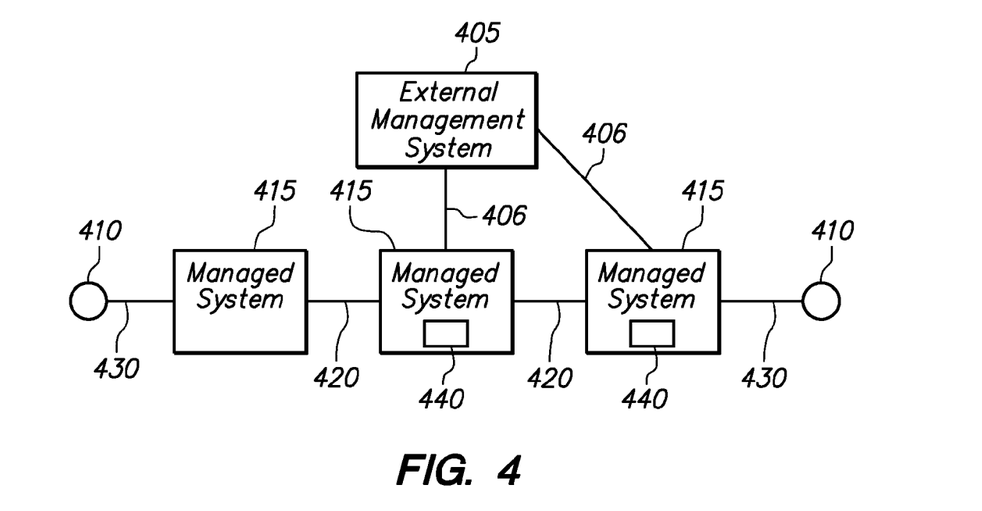
FIG. 4 illustrates an embodiment of managed systems communicating event information to other managed systems and to external management systems.
Figure 5:
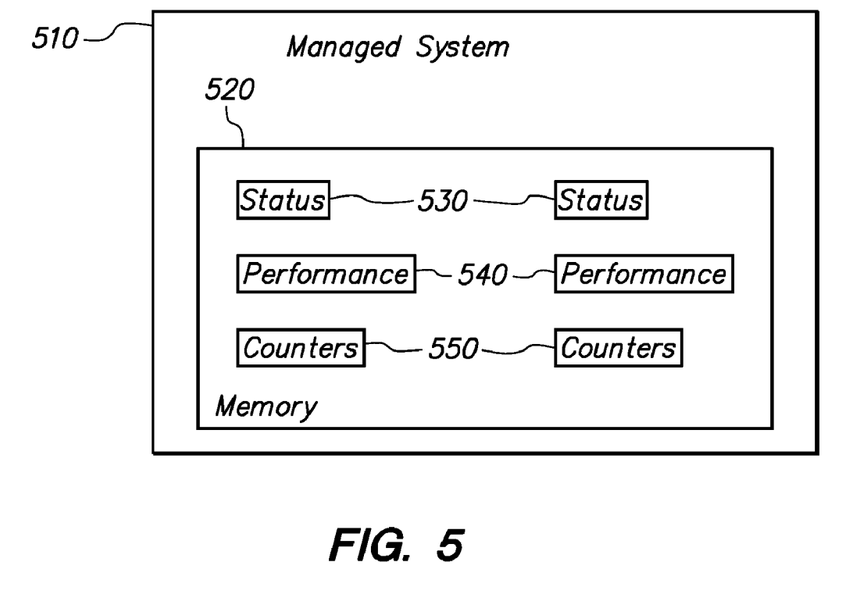
FIG. 5 illustrates an embodiment of a managed system.
Figure 6:
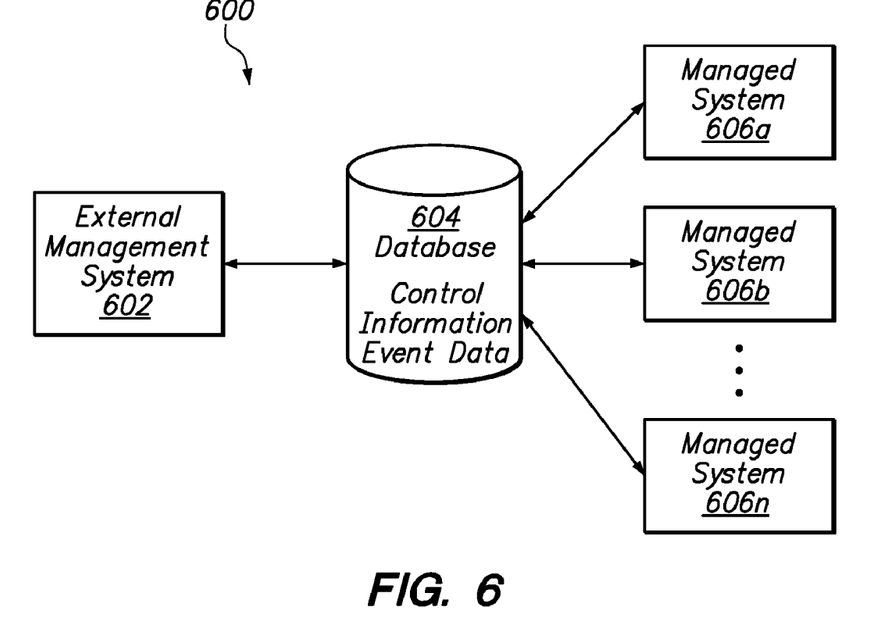
FIG. 6 illustrates an embodiment of an aggregate system comprising an external management system and managed systems.

FIG. 1 illustrates an embodiment of an aggregate system comprising external management systems and managed systems; FIG. 2 illustrates an embodiment of an external management system; FIG. 3 illustrates an embodiment of a managed system; FIG. 4 illustrates an embodiment of managed systems communicating event information to other managed systems and to external management systems; FIG. 5 illustrates an embodiment of a managed system; FIG. 6 illustrates an embodiment of an aggregate system comprising an external management system and managed systems. Referring first to FIG. 1, in an embodiment, an aggregate system 100 comprises one or more external management systems 110a-110b, and one or more managed systems 120a-120d. Each of the external management systems and managed systems may be a computer as further described herein. External management systems 110a-110b communicate with managed systems 120a-120d via links 130.

External management systems 110a-110b comprise, in various embodiments, one or more processors, one or more memory units, one or more communications interfaces, an event processing logic and other components specific to the system implementation. Examples of the internal structures of external management systems 110a-110b are described in more detail in connection with FIG. 3. Examples of external management systems 110a-110b include network management stations, or general-purpose computers hosting or executing network management software, such as Resource Management Essentials from Cisco Systems, Inc., San Jose, Calif.

Managed systems 120a-120d comprise, in various embodiments, one or more processors, one or more memory units, one or more communications interfaces, an event processing logic and other components specific to the system implementation. Examples of the internal structures of managed systems 120a-120d are described in more detail in connection with FIG. 2. Examples of managed systems 120a-120b include network infrastructure elements such as routers, switches, firewalls, and gateways; general purpose computers; printers; scanners; multifunction printers; and any other computing infrastructure device or end station device that is capable of management.

External management systems 110a-110b may control and monitor operations performed by managed systems 120a-120d. For example, external management systems 110a-110b may send to managed systems 120a-120d control information, values for system parameters, configuration information, and requests for information.

Managed systems 120a-120d may monitor the operations performed by components of managed systems 120a-120d, and may generate information about various events taking place in the managed systems. The event information may be related, for example, to status of the operations performed by the components of the managed systems, statistical information and other type of information. The event information may be stored in storage and communicated to external management systems 110a-110b.

In an embodiment, the event information is communicated to external management systems 110a-110b according to instructions received from the external management systems. For example, external management systems 110a-110b may provide to managed systems 120a-120d instructions specifying the type of events and the type of event information to send to external management systems 110a-110b. Further, external management systems 110a-110b may provide instructions regarding a frequency to send event reports to the external management systems. Upon receiving the instructions, managed systems 120a-120d may start collecting information about the events, process the collected information, generate status information and performance statistics, and communicate the event information to external management systems 110a-110b.

In an embodiment, external management systems 110a-110b communicate with managed systems 120a-120d using communications links such as connections 130. Connections 130 may be implemented using one or more technologies such as wireless, Ethernet, ATM, and optical links.

Within aggregated system 100, external management systems 110a-110b and managed systems 120a-120d may be divided into clusters. In an embodiment depicted in FIG. 1, two clusters are provided. As depicted in FIG. 1, one cluster is managed by external management system 110a and another cluster is managed by external management system 110b. In the first cluster, external management system 110a manages and monitors managed systems 120a, 120b, 120c, and in the second cluster, external management system 110b manages and monitors managed systems 120c and 120d. The clusters may overlap, but overlap is not required. In FIG. 1, managed system 120c is managed by both external management system 110a and external management system 110b. The clustering scheme of the aggregate systems may change in time to reflect reconfiguration changes requested by a system administrator or by components of the aggregate systems.

In an embodiment, managed systems 120a-120d may send event information 140 to external management systems 110a-110b according to a schedule or any other scheme that is established for the event communications between managed systems 120a-120d and external management systems 110a-110b.

Managed systems 120*a*-120*d* may send event information 140, 151 to external management systems 110*a*-110*b* according to various methods. A particular method with which managed systems 120*a*-120*d* sends event information to external management systems 110*a*-110*b* may be selected or determined by external management systems 110*a*-110*b*, and/or by managed systems 120*a*-120*d*. A particular method may apply to all or some managed systems 120*a*-120*b*, to all or some events, and/or to all or some external management systems 110*a*-110*b*. For example, a particular method may apply to all or some events generated by managed system 120*a* and sent to all or some external management systems 110*a*-110*b*. According to another example, a particular method may apply to all or some events generated by all or some managed systems 120*a*-120*d* and sent to external management system 110*a*. According to other example, a particular method may apply to a particular event generated by a particular managed system and sent to a particular external management system.

In an embodiment, managed systems 120*a*-120*d* may send event information to external management systems 110*a*-110*b* asynchronously. With asynchronous reporting, managed systems 120*a*-120*d* may send event information to external management systems 110*a*-110*b* even if the external management systems have not requested the information. For example, if managed system 120*a* asynchronously sends a particular event 140 to external management system 110*a*, then managed system 120*a* can send the particular event 140 to external management system 110*a* even if external management system 110*a* has not sent a request to managed system 120*a* for information about the particular event 140.

In an embodiment, managed systems 120*a*-120*d* may send event information to external management systems 110*a*-110*b* synchronously. With synchronous reporting, managed systems 120*a*-120*d* may send event information to external management systems 110-110*b* only if the external management systems have requested the information. For example, if managed system 120*c* sends, to external management system 110*b*, a particular event 151 synchronously, then managed system 120*c* can send the particular event 151 to external management system 110*b* only upon receiving, from external management system 110*b*, a request 150, in which external management system 110*b* requests the particular event 151 from managed system 120*c*.

Referring now to FIG. 2, in an embodiment, an external management system 210 comprises one or more instances of each of the following: a processor 215, a memory 216, a communications interface 217, event processing logic 218, management logic 219, and other resources 222. External management system 210 may also comprise one or more storage devices 220, which may be local with respect to external management system 210, or remote with respect to external management system 210, as depicted in FIG. 2. External management system 210 may be implemented as a special-purpose computer, general purpose computer, using hardware logic such as in an application-specific integrated circuit (ASIC) or field-programmable gate array (FPGA), system-on-a-chip (SoC), or other combinations of hardware, firmware and/or software.

In an embodiment, one or more processors 215 host or execute event processing logic 218, which is configured to execute one or more computer programs, and invoke various software elements stored in memory 216 and/or storage 220. For example, event processing logic 218 may execute instructions from an operating system, various software applications, programs configured to call an application programming interface (API) of the operating system and other programs available to the event processing logic 218.

In an embodiment, external management system 210 communicates with one or more external management systems and one or more managed systems using communications interface 217 to send control information and to receive event information.

In an embodiment, management logic 219 implements device, system, or network management functions and provides facilities to communicate management information to and from a managed system and to configure the managed system. For example, management logic 219 comprises an instance of Resource Management Essentials.

In an embodiment, storage 220 may be any of volatile or non-volatile storage medium, and may be provided by various vendors and manufacturers. In an embodiment, resources 222 may include additional storage, printing equipment, faxing/copying equipment, and any other types of resources.

Referring now to FIG. 3, in an embodiment, a managed system 310 comprises one or more instances of each of the following: a processor 315, a memory 316, a communications interface 317, an event processing logic 318, and other resources 322. Managed system 310 may also comprise one or more storage devices 320, which may be local with respect to managed system 310, or remote with respect to managed system 310, as depicted in FIG. 3.

In an embodiment, event processing logic 318 is executed by one or more processors 315. Event processing logic 318 is configured to execute one or more computer programs, and invoke various software elements stored in memory 316 and/or storage 320. For example, event processing logic 318 may execute instructions from an operating system, various software applications, programs configured to call an application programming interface (API) of the operating system and other programs available to the event processing logic 318.

In an embodiment, managed system 310 communicates with one or more external management systems and one or more managed systems using communications interface 317 to receive control information and to send event information.

In an embodiment, storage 320 may be any of volatile or non-volatile storage medium, and may be provided by various vendors and manufacturers. In an embodiment, resources 322 include any resources that managed system 310 may require. For example, resources 322 may include a switching system, route storage, packet forwarding logic, additional storage, printing equipment, faxing/copying equipment, and any other types of resources.

Managed system 310 may be implemented as a special-purpose computer, general purpose computer, hardwired device or logic such as an ASIC or FPGA, or software-hardware implementations. In certain embodiments, managed system 310 comprises a networking infrastructure element such as a router, switch, firewall, or gateway. In some embodiments, managed system 310 may include packet processing logic configured for forwarding, routing, or switching data packets and configured to store, update, and advertise routes, capabilities, and other internetworking information. Managed system 310 may also host, as part of event processing logic 318 or in separate logic, one or more agents that implement network management protocols and configured to send and respond to network management protocol requests and responses. For example, event processing logic 318 may implement simple network management protocol (SNMP) and memory 316 or resources 322 may store or comprise one or more management information bases (MIBs) configured to store MIB objects.

Referring now to FIG. 4, in an embodiment, managed systems 415 communicate event information to other managed systems and to one or more instances of an external management system 405. In an embodiment, external management system 405 controls and monitors one or more managed systems 415. External management system 405 communicates with managed systems 415 via communications links 406, which can be unidirectional or bidirectional.

Managed systems 415 communicate with each other via communications links 420, which can be unidirectional or bidirectional. Two or more managed systems 415 may be connected in a series, in a ring, according to any combination of series and rings, and/or according to any other topology. In an embodiment, a communications link between managed systems 415 have endpoint connections 430, which are terminated at endpoints 410. Endpoint connections 430, communications links 420, and communications links 406 may be implemented using any of several technologies such as wireless, Ethernet, ATM, and optical links.

During operations of the managed systems, managed systems 415 generate and collect information about various events. Event information may be captured in one or more units of information 440. Units of information 440 may be communicated between managed systems 415 and/or between managed systems 415 and external management system 405. Units of information 440 comprise event information that managed systems 415 report to external management system 405. Units of information 440 are reported according to any method protocol that is compatible with managed systems 415 and external management system 405, or that was agreed upon or which the systems accepted.

In an embodiment, units of information 440 are reported to external management system 405 synchronously, that is, upon receiving or in response to a request for information from external management system 405. In an embodiment, before managed system 415 reports a unit of information 440 to external management system 405, the managed system determines whether the event can be or should be reported, and if so, whether a request for the event previously was received from external management system 405.

In an embodiment, units of information 440 are reported to external management system 405 asynchronously, that is regardless whether external management system 405 has requested the units of information 440 from the managed systems 415. In an embodiment, managed system 415 can report a particular unit of information 440 to the external management system 405 even if the external management system 405 has not sent a request for the particular unit of information 440.

In an embodiment, units of information 440 are communicated between managed systems 415 along communications links 420, and between the managed systems and external managed system 405 along communications links 406. Communications links 420 may be used to communicate control information between managed systems 415 and to communicate status and statistical information between the managed systems.

Communications links 406 may be used by managed systems 415 to report one or more units of information 440 to external management system 405, and by external management systems to request one or more units of information 440 from managed systems 415. Communications links 406 may be also used to send, to managed systems 415, instructions about sending one or more units 440 to external management system 405 and about sending any other type of information.

For purposes of illustrating clear examples, FIG. 4 shows one external management system 405 and three instances of managed system 415. However, practical embodiments may use any number of external management systems 405 and any number of managed systems 415.

Referring now to FIG. 5, in an embodiment, a managed system 510 contains one or more instances of memory 520 for storing multiple units of information that capture information about events generated by components of managed system 510. Memory 520 may comprise any of RAM, ASIC, ROM, and disk. In an embodiment, memory 520 may include multiple units of information including, but not limited, to system status information 530, performance information 540, counter values information 550, and various types of information and statistics that are specific to managed system 510. Managed system 510 may use the values stored in units of information units 530, 540, 550 to generate events and to report specific information about the events to external management systems.

For purposes of illustrating clear examples, FIG. 5 shows one instance of memory 520 and three units of information 530, 540, 550. However, practical embodiments may use any number of units and any number of instances of memory 520.

Referring now to FIG. 6, in an embodiment, an aggregate system 600 comprises an external management system 602, managed systems 606a-606n and a database 604.

External management system 602 may communicate with managed systems 606a-606n via database 604. Alternatively, external management system 602 may communicate with managed systems 606a-606n directly, using database 604 to share data with managed systems 606a-606n.

In an embodiment, managed systems 606a-606n comprise multiple sub-systems. Examples of sub-systems include an SNMP sub-system, BGP sub-system, and IPsec sub-system. External management system may communicate directly and individually with each of the multiple sub-systems of managed systems 606a-606n. Alternatively, external management system 602 may communicate directly with managed systems 606a-606n, and indirectly with the multiple sub-systems of managed systems 606a-606n. The sub-systems of managed systems 606a-606n may communicate events directly to external management system 602. The sub-systems of managed systems 606a-606n may communicate events to managed systems 606a-606n and have managed systems 606a-606n communicate the events to external management system 602.

In an embodiment, external management system 602 and managed systems 606a-606n communicate via database 604, which connects the systems via bidirectional and/or unidirectional communications links. Managed systems 606a-606n may store data in database 604, from which external management system 602 may retrieve (pull) the information. Similarly, external management system 602 may store data in database 604, from which managed system 606a-606n may retrieve (pull) the information for the future use.

In an embodiment, external management system 602 sends control information and event information requests to managed systems 606a-606n to facilitate communications between the external management system and the managed systems. The control information and event information requests may be stored in database 604, and pulled by managed systems 606a-606n. Alternatively, the information may be sent directly from external management system 602 to managed systems 606a-606n.

In an embodiment, managed systems 606a-606n may send event information to external management system 602. The information may be stored in database 604, and pulled by external management system 602 and/or other managed systems. Alternatively, the information may be sent directly from managed systems 606a-606n to external management system 602 and to other managed systems.

3.0 Examples of Relationships Between Events

In an embodiment, external management systems limit the amount of information that is reported from managed systems to the external management systems by providing instructions to managed systems about the type of reported events and the frequency of reporting. The instructions comprise control information that the managed systems use to determine which events, and how often, should be reported to the external management systems and which events should not be reported.

In an embodiment, control information may be based on information describing relationships between the events that are generated by managed systems, describing how the events are related to each other and describing which events are in the same relationship.

Various relationships may exist between events generated within one aggregate system. The relationships between the events may represent dependencies between events that are generated within one managed system and/or dependencies between events that are generated by a plurality of managed systems. For example, some events generated by one managed system may be related to other events generated by the same managed system. As another example, some events generated by one managed system may be related to the events that are generated by other managed systems.

In an embodiment, information about relationships is collected by external management systems. Alternatively, the information about relationships is provided to the external management systems by other systems. The relationship information can be collected using daemons, schedulers and other logic adapted for this purpose. The relationship information may be stored at each of the external management systems. Alternatively, the relationship information may be stored at dedicated external management systems or at a database that is shared between the external management systems.

In an embodiment, the relationship information may be periodically pushed to the external management systems and/or periodically pulled from the shared resource by the external management systems.

In an embodiment, the process of collecting relationship information starts from collecting information about events generated by managed systems and sending the collected information to external management systems. The external management systems determine how the events are related to each other and generate relationship information. The relationship information is distributed to the managed systems.

In an embodiment, external management systems and/or managed system use relationship information to determine characteristics that are associated with respective events and that the managed systems may use to control the amount of reports that the managed systems send to the external management systems. For example, based on the characteristics associated with the events, the managed systems may determine whether reporting of a particular event that is generated by the managed system should be suppressed or not, whether reporting of the particular event is enabled or disabled, whether reporting of the particular event should be synchronous or asynchronous, etc.

Various types of relationships between events generated by managed systems may be identified. Examples of various relationships may include, but are not limited to, containments, associations, parent-child, sequential-time-ordered relationships, weighted relationships, aggregations, compositions, generalizations, realizations, compound relationships, OR-relationships, AND-relationships, member-of relationships, not-member-of relationships, and any other relationships that may exist between two or more events.

In an embodiment, two or more events are in a containment relationship. In a containment relationship, one event assumes a role of a container, and contains one or more other events. A container event corresponds to an object that is configured to hold contained events. For example, generating performance reviews for all employees in a department is in a containment relationship with generating an individual performance review for a particular employee in the department. In this example, generating performance reviews for all employees in the department is a container event, while generating an individual performance review for a particular employee in the department is a contained event.

A containment relationship may be described in a context of a network interface device. A chassis of the network interface device may hold one or more cards. Each of the cards may include one or more ports. Thus, a particular port is contained in a particular card, and a particular card is contained in a particular chassis. Consequently, events generated by the particular port are contained in the events generated by the particular card, and the events generated by the particular card are contained in the events generated by the particular chassis. Hence, the relationship between the events of the particular port and the events of the particular card is a containment relationship, and so are the events of the particular card and the events of the particular chassis.

In an embodiment, if two events are in a containment relationship, then a managed system may evaluate one or more conditions to determine whether one event is communicated to an external management system if another event is present. For example, one condition may require that if two events are in a containment relationship and a container event is present, then information about a contained event is not communicated to the external management system. According to another condition, if two events are in a containment relationship and a contained event is present, then information about a container event is not communicated to the external management system.

In an embodiment, two or more events are in an association relationship. In an association relationship, one event is associated with another event if there is a logical connection or a logical link between the two events. For example, sending a message and receiving the message are associated events.

An association relation may be described in a context of a computer network. For example, if a network topology includes two or more routers, the routers that directly communicate with each other may be in an association relationship. The events generated by a first router may be associated with the events generated by a second router. If the first router sends a message to the second router and the second router receives the message, then the sending the message and receiving the message are associated events. Hence, an association relationship exists between the events of the first router and the events of the second router.

A reciprocal association relationship does not necessarily exist. For example, if the events of the first router are associated with the events of the second router, the events of the second router may or may not be associated with the events of the first router.

In an embodiment, two or more events are in a parent-child relationship. In a parent-child relationship, one event is a parent event to one or more other child events. For example, a computer process that spawns one or more sub-processes may have a parent-child relationship with the sub-processes. A parent-child relationship may be described in a context of a computer network. For example, a network management node that performs management functions and oversees a network of routers and switches may be in a parent-child relationship with the routers and switches. In this relationship, the network management node is the parent and the routers and switches are children.

In an embodiment, two or more events are in a sequential-time-ordered relationship. In a sequential-time-ordered relationship, one event precedes another event and occurs before another event takes place. For example, sending a response to a particular request occurs after receiving the particular request. A sequential-time-ordered relation may be described in a context of computer network. For example, receiving a data packet at a particular network node precedes forwarding the data packet by that node to another node. The packet receiving event precedes the packet forwarding event.

In an embodiment, two or more events are in a weighting relationship. If two or more events are in a weighting relationship, then each of the one or more events has an associated weighting factor that may indicate importance of the particular events, its urgency or any other attribute with respect to another event. For example, receiving a message with a normal delivery attribute may have a lower weighting factor than receiving a message with an urgent delivery attribute. A weighting relationship may be described in a context of a computer network. For example, receiving an integrity check request at a node may supersede any other tasks performed by that node. Thus, the receiving the integrity check request may have associated a high weight value, while other tasks may have associated lower weight values.

In an embodiment, two or more events are in an aggregation relationship. An aggregation relationship is a variant of the association relationship described above. However, the aggregation relationship is more specific than an association. An aggregation may be similar to an association except that an aggregation may not involve more than two classes of the events.

In an embodiment, two or more events are in a composition relationship. A composition relationship is also a variant of an association; however, it even is more specific than an aggregation. While an aggregation relationship is often called a "catalog" of related objects, a composition relationship may be termed a "physical" object.

In an embodiment, two or more events are in a generalization relationship. A generalization relationship is an inheritance relationship and may be easily understood by the phrase "A is B," which means that A has the characteristics of B. For example, a BGP router belongs to a group of routers because the BGP router has the typical characteristics of a typical router. Thus, although a BGP router is a specialized router, the BGP router is still a router.

In an embodiment, two or more events are in a realization relationship. A realization relationship is a relationship between two model elements in which one model element (the client) realizes the behavior that another model element (the supplier) specifies. A realization relationship may be identified between classes, interfaces, components, and packages that connect a client element with a supplier element.

In an embodiment, two or more events are in a compound relationship. A compound relationship is a hybrid of any of two or more relationships, and is created by concatenating the two or more relationships with using logical operators. Examples of logical operators include AND, OR, NOT, MEMBER OF, NOT A MEMBER OF, etc. For example, two events may be in a parent-child relationship, AND also in an association relationship.

In an embodiment, a compound relationship may be expressed using a logical AND connector to connect two events that are in a sequential-time-ordered relationship AND in a parent-child relationship. For example, a first event precedes a second event (the sequential-time-ordered relationship), AND the first event is a parent of the second event (the parent-child relationship). A managed system may evaluate one or more conditions to determine whether the first event and/or the second event should be communicated to an external management system. For example, a condition may indicate that if the first event and the second event are in the sequential-time-ordered relationship AND in the parent-child relationship, and if the first event is present, then reporting of the second event is suppressed. According to another example of the same compound relationship, a condition may indicate that if the second event is present, then reporting of the first event is suppressed.

4.0 Examples of Conditions

In an embodiment, external management systems send information about the relationships between the events generated by managed systems to the managed systems. The managed systems use the relationship information to determine a set of conditions that the managed systems can use to control emission of events from the managed systems to the external management systems. In particular, the set of conditions allows a managed system to determine whether to suppress reporting an event generated by the managed system.

In an embodiment, a particular event is reported by a managed system to an external management system only if one or more conditions associated with the particular event are satisfied. The conditions may be communicated to the managed system by an external management system, or may be determined by the managed system based on information that the managed system generated or obtained. Furthermore, some of the conditions may be communicated to all managed systems in an aggregated system, while other conditions may be communicated to some but not all managed systems.

In an embodiment, a condition associated with a particular event includes evaluating one or more relationships in which the particular event is present. For example, the particular condition may require determining whether the particular event is in a relationship with other events, and if so, whether the other events are present and whether the conditions associated with the other events are satisfied.

In an embodiment, a particular condition includes evaluating events that are in relationships with a particular event, and it is determined that the particular event is in a parent-child relationship with a second event, and that the second event is in a parent-child relationship with a third event. Then, determining whether the particular condition is satisfied may depend on whether the conditions associated with the parent-child relationship of the second event and the third event is satisfied and then whether the conditions associated with the parent-child relationship of the first event and the second event are satisfied. If the conditions associated with the second and the third events are satisfied and require suppressing of the event data from the second and third events, then the particular condition may also require suppressing reporting data from the particular event.

5.0 Process of Controlling Emission of Events

Figure 7:
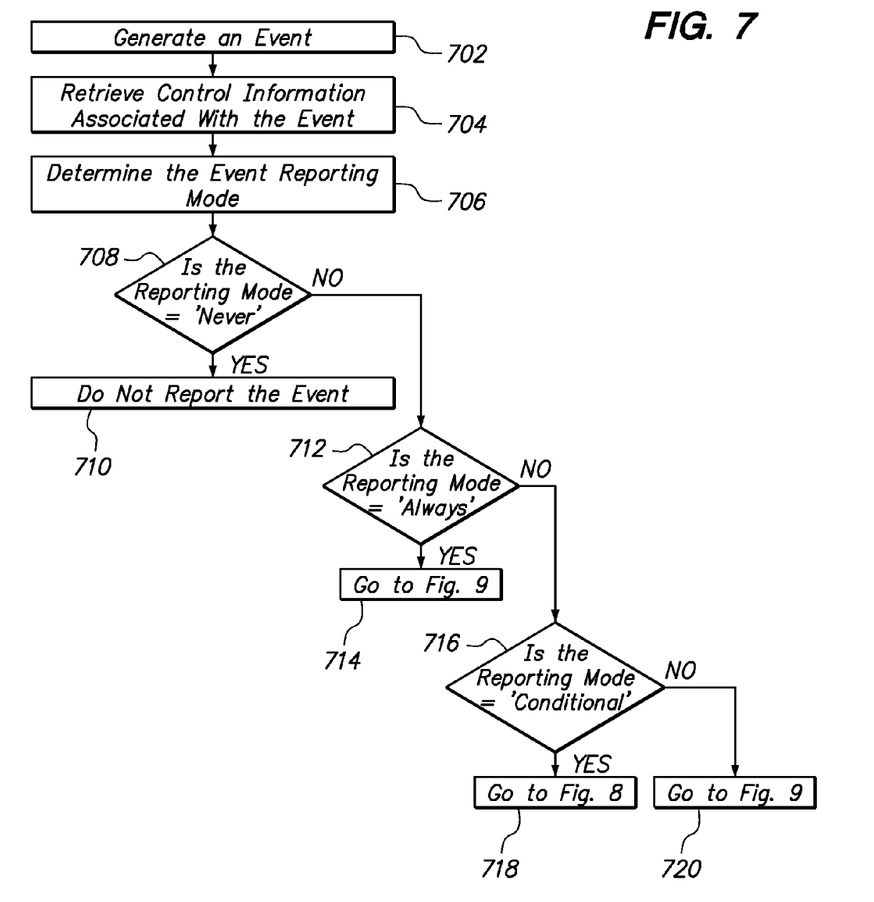
FIG. 7 illustrates an approach for controlling emission of events from a managed system to an external management system.
Figure 8:
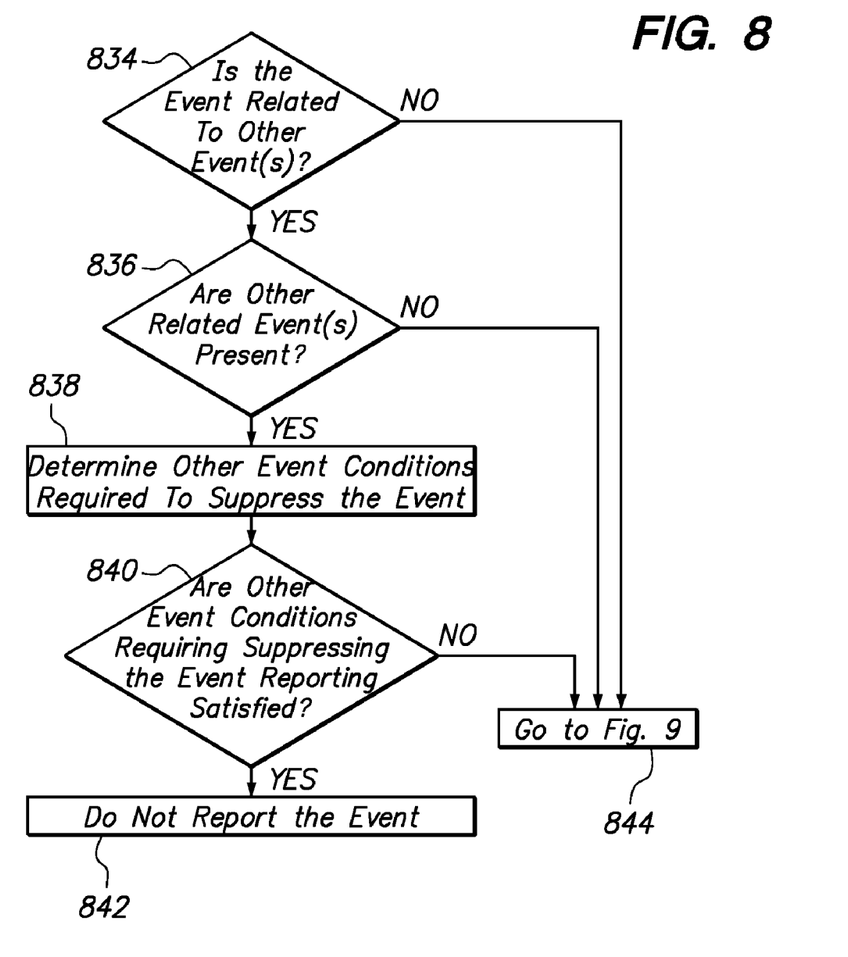
FIG. 8 illustrates another embodiment of an approach for controlling emission of events from a managed system to an external management system.
Figure 9:
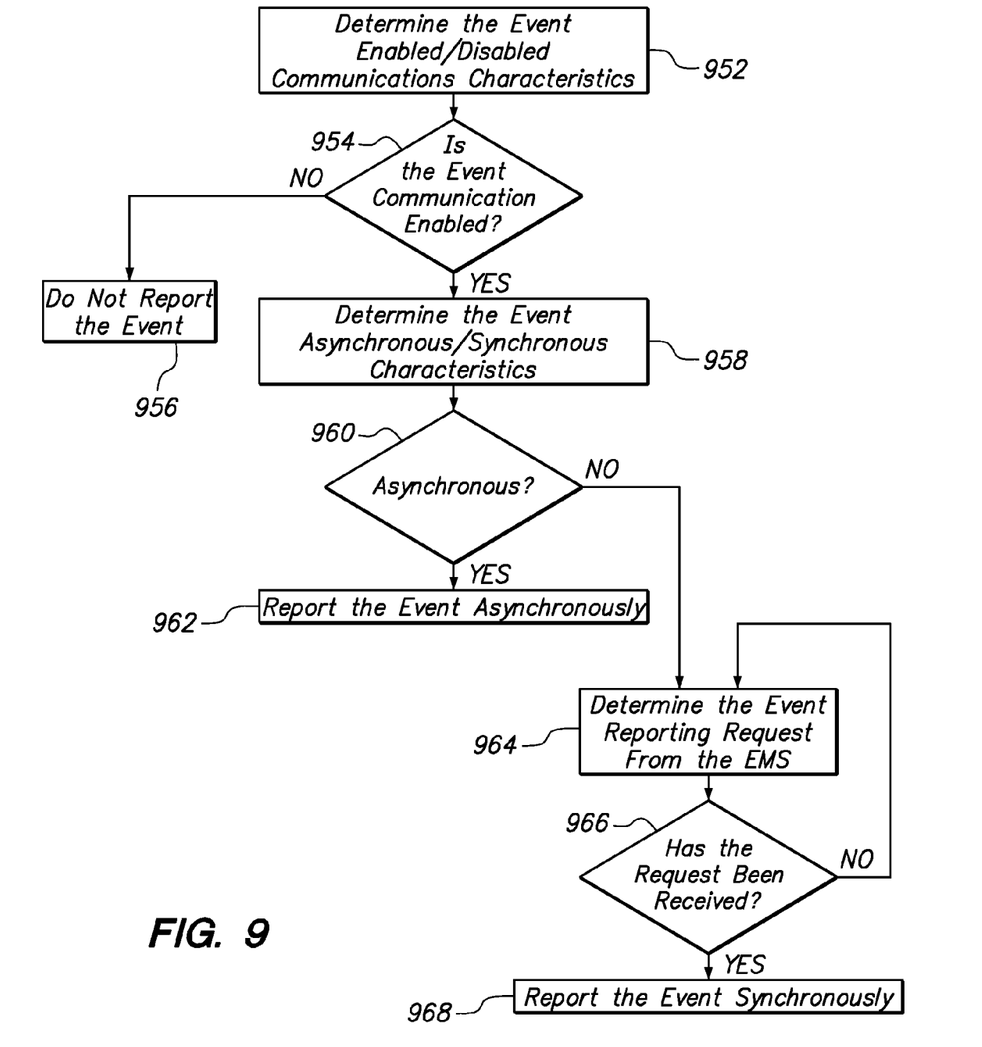
FIG. 9 illustrates other embodiment of an approach for controlling emission of events from a managed system to an external management system.

FIG. 7 illustrates an approach for controlling emission of events from a managed system to an external management system; FIG. 8 illustrates another embodiment of an approach for controlling emission of events from a managed system to an external management system; FIG. 9 illustrates other embodiment of an approach for controlling emission of events from a managed system to an external management system.

Referring now to FIG. 7, in operation 702, a managed system generates an event. Information about the event may be generated by one or more components of the managed system and may be related to processes executed by the components, status and statistical information of the components, configuration information about the components, errors that occurred during execution of the processes by the components and any other type of information related to functions performed by the managed system. An event may be generated as a result of changes taking place within the managed system including changes in the status of the managed system, changes in data recorded by counters and changes in states of managed devices and components, and/or as a result of conditions related to the status, operation, performance, and other characteristics of the managed system.

In operation 704, the managed system retrieves control information that is associated with the particular event. Control information associated with the particular event may be any type of information that an external management system provided to the managed system in advance, or any type of information that the managed system generated based on the information received from the external management system and/or based on the information currently available to the managed system from various sources.

In an embodiment, control information associated with the particular event comprises information about relationships in which the particular event is present and about other events that are in relationships with the particular event. Examples of various relationships involving the particular event may include, but are not limited to, containments, associations, parent-child, sequential-time-ordered relationships, weighted relationships, aggregations, compositions, generalizations, realizations, compound relationships, OR-relationships, AND-relationships, member-of relationships, not-member-of relationship and any other relationships that may be defined between two or more events.

In an embodiment, control information associated with the particular event comprises information about conditions that are associated with the particular event.

In operation 706, the managed system determines a reporting mode that is associated with the particular event. The reporting mode is used by the managed system as one of a plurality of conditions to decide whether the particular event should be communicated to the external management system. Examples of reporting modes may include, but are not limited to, never report, always report and report conditionally. If the reporting mode is 'never,' then the managed system cannot report any information about the particular event to the external management system. If the reporting mode is 'never' in a system that comprises more than one external management system, then the managed system may be unable to report information about the particular event to some external management systems but may be allowed to report information about the particular event to remaining external management systems.

If the reporting mode is 'always,' then the managed system should always report the information about the particular event to an external management system. If the reporting mode is 'always' in a system that comprises more than one external management system, then the managed system should always report the information about the particular event to some external management systems, but not always to others.

If the reporting mode is 'conditional,' then the managed system can report the information about the particular event only if the conditions associated with the particular event are satisfied. Logic used to determine if the event should be communicated to the external management system takes into consideration the relationships in which the particular event is present. If the reporting mode is 'conditional' in a system that comprises more than one external management system, then the managed can report the information about the particular event to a particular external management system only if the conditions associated with the particular event and the particular external management system are satisfied.

In operation 708, the management system determines whether the reporting mode associated with the particular event is 'never.' If it is determined that the particular event should never be reported to the external management system, then, in operation 710, the managed system suppresses reporting of the particular event. However, if it is determined that the reporting mode associated with the particular event is not 'never' then the managed system moves on to performing operation 712.

In operation 712, the managed system determines whether the reporting mode associated with the particular event is 'always,' and if so, then the managed system moves on to performing operation 714 and to performing operations depicted in FIG. 9. However, if it is determined that the reporting mode associated with the particular event is not 'always,' then the managed system moves on to performing operation 716.

In operation 716, the managed system determines whether the reporting mode associated with the particular event is 'conditional,' and if so, then the managed system moves on to performing operation 718 to performing operations depicted in FIG. 8. However, if it is determined that the reporting mode associated with the particular event is not 'conditional,' then the managed system moves on to performing operation 720 to performing operations depicted in FIG. 9.

Referring now to FIG. 8, in an embodiment, an approach for controlling emission of events from a managed system to an external management system is illustrated. In operation 834, the management system determines whether the particular event is related to any other event or events.

In an embodiment, the particular event may not be present in any relationship with any other event. If the particular event is not related to any other event, then the managed system moves on to performing operation 844 and to performing operations of FIG. 9.

In an embodiment, the particular event may be in one or more relationships with other events and in multiple relationships with the same other events. Examples of various relationships involving the particular event may include, but are not limited to, containments, associations, parent-child relationships, sequential-time-ordered relationships, weighted relationships, aggregations, compositions, generalizations, realizations, compound relationships, OR-relationships, AND-relationships, member-of relationships, not-member-of relationships and any other relationships that may be defined between two or more events. If the particular event is at least in one relationship with at least one other event, the managed system may create a list, a table or any other structure containing information about the relationships in which the particular event is present.

In operation 836, the managed system determines whether the related event or events are present. However, if the related event or events are not present, then the managed system moves on to performing operation 844 and to performing operations of FIG. 9.

If the other events related to the particular event are present, then, in operation 838, the managed system determines the conditions that are associated with the other events.

In an embodiment, the conditions may specify whether the information about the particular event should be suppressed. For example, the particular event may be in a parent-child relationship with a second event, and the second event may have an associated particular condition that specifies that if the particular event and the second event are both present, then the information about the particular event should be suppressed. Accordingly, if the particular event and the second event are in the parent-child relationship, the particular condition is associated with the second event, and both the particular event and the second event are present, then the information about the particular event should be suppressed.

In operation 840, the managed system determines whether conditions associated with the particular event and the conditions associated with the events that are in relationships with the particular event are satisfied. For example, the particular event may be in a parent-child relationship with a second event. Furthermore, the second event may have an associated particular condition that provides that if the particular event and the second event are both present, then the information about the particular event should be suppressed but the information about the second event should not be suppressed. Accordingly, because the particular event and the second event are in the parent-child relationship, the particular condition is associated with the second event, and both the particular event and the second event are present, then the information about the particular event should be suppressed.

According to another example, the particular event may be in a parent-child relationship with a second event, and the second event may have an associated particular condition that provides that if the particular event and the second event are present, then the information about the particular event should not be suppressed but the information about the second event should be suppressed. In this example, because the particular event and the second event are in the parent-child relationship, the particular condition is associated with the second event, and both the particular event and the second event are present, then the information about the particular event should not be suppressed.

The above examples are provided only to illustrate some of the embodiments. However, practical embodiments may include multiplicity of relationships and conditions.

If in operation 840 the management system determined that other event conditions that are associated with other events that are in relationships with the particular event and that require to suppress reporting of the information about the particular event are satisfied, then the managed system moves on to performing operation 842 and does not report the information about the particular event. However, if the other event conditions that require suppressing reporting of the information about the particular event are not satisfied, then the managed system moves on to performing operation 844 and to performing operations of FIG. 9.

Referring now to FIG. 9, in an embodiment, an approach for controlling emission of events from a managed system to an external management system is illustrated. In operation 952, the managed system determines enabled/disabled communications characteristics that are associated with the particular event.

In an embodiment, the particular event may have associated enabled/disabled communications characteristics that provide information whether communication of the particular event is enabled or disabled. For example, even if the managed system determined, based on relationship information associated with the particular event, that the information about the particular event should be reported to an external management system, reporting of the particular event may be still suppressed if the communication of the particular event is disabled at a particular moment. According to another example, if the managed system determined that the particular event is not related to any other event, reporting of the particular event may be suppressed if the communication of the particular event is disabled at a particular moment.

In an embodiment, the enabled/disabled communications characteristics that are associated with the particular event and that provide information whether communication of the particular event is enabled or disabled are stored in structures comprising toggles, such as an enable/disable toggle.

In operation 954, the managed system determines whether communication of the particular event is enabled, and if it is not, the managed system moves on to performing operation 956 and does not report the particular event.

However, if the communication of the particular event is enabled, in operation 958, the managed system determines asynchronous/synchronous characteristics that are associated with the particular event. Examples of the associated asynchronous/synchronous characteristics may include an asynchronous characteristics and synchronous characteristics.

If the particular event is associated with the asynchronous characteristics, then, assuming that all the related conditions are satisfied and the information about the particular event should not be suppressed, the information about particular events should be immediately send to an external management system even if the external management system has not requested the particular event.

If the particular event is associated with the synchronous characteristics, then, assuming that all the related conditions are satisfied and the information about the particular event should not be suppressed, the managed system may send the information about the particular event only after receiving a request from the external management system for information about the particular event.

In operation 960, the managed system determines whether the particular event should be sent to the external management system asynchronously, and if so, the managed system reports the particular event asynchronously in operation 962. However, if the particular event should be reported synchronously, then, in operation 964, the managed system determines whether it received, form the external management system, a request to report the particular event.

If in operation 966 the managed system determined that the request to report the particular event was received from the external management system, then in operation 968, the managed system synchronously reports the particular event to the external management system. However, if in operation 966 the managed system determined that the request to report the particular event was not received from the external management system, then the managed system loops back to operation 964 and waits for receiving such a request.

The managed system may use control information to select a time period for synchronous communication of events to the external management system and to avoid deadlocks of the managed system while awaiting the request from the external management system. In an embodiment, the managed system may also send a reminder to the external management system or any other message that would permit the managed system wait only for a particular period of time and terminate the wait if the request is not received by the managed system before the expiration of the particular period of time.

The examples of control information presented in this description, the examples of event reporting modes and the examples of relationships and conditions are only some of the possible examples and are not intended to restrict in any way implementations of the disclosed approach.

The flow diagrams presented in this description and the decision paths illustrated are only examples of possible decisions that may be made in the managed system and are not intended to restrict in any way the disclosed approach of other control information values or types that may be used to determine whether event information is suppressed or communicated from a managed system to an external management system.

6.0 Implementation Mechanisms—Hardware Overview

Figure 10:
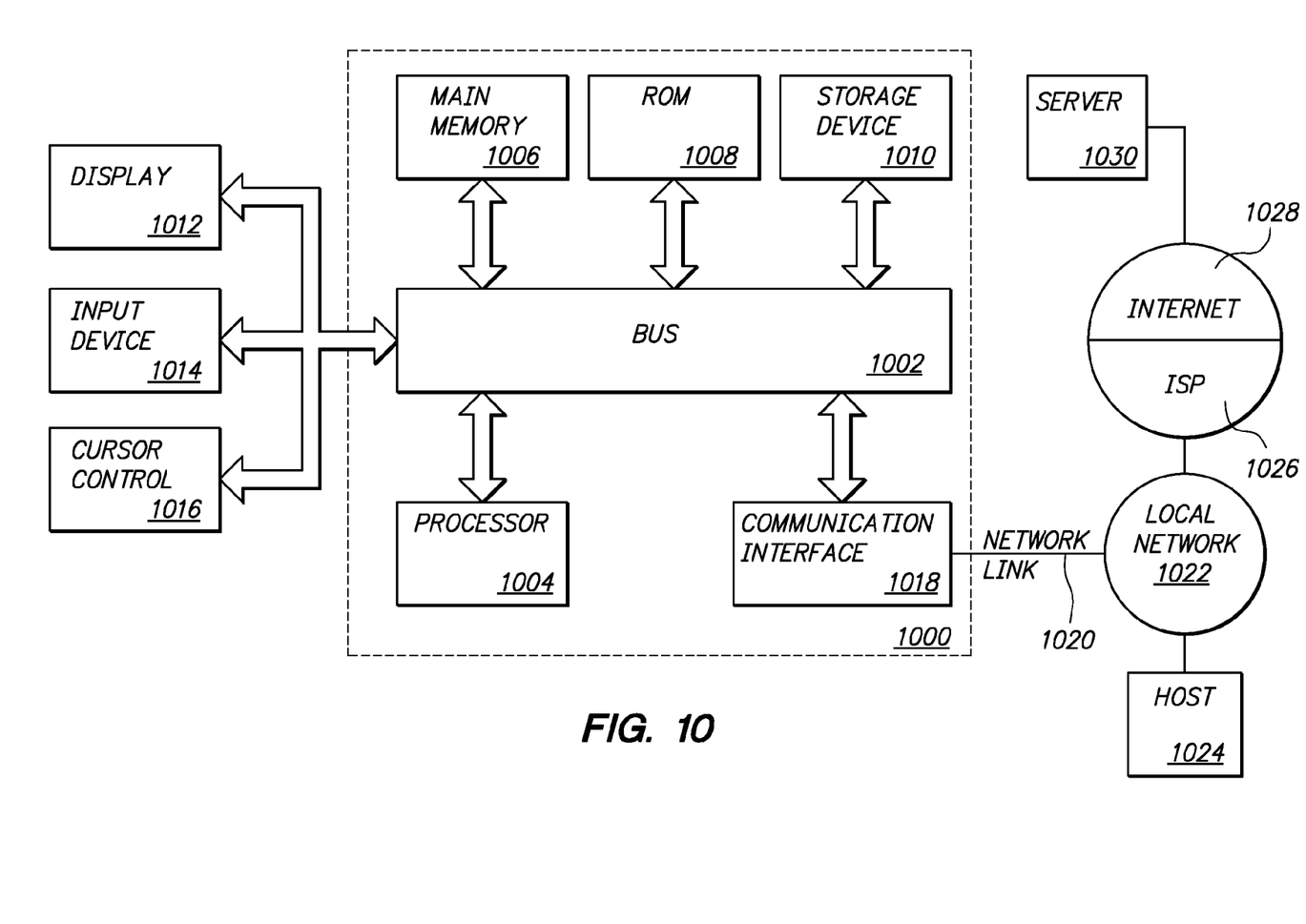
FIG. 10 illustrates a computer system upon which an embodiment may be implemented.

FIG. 10 is a block diagram that illustrates a computer system 1000 upon which an embodiment of the invention may be implemented. The preferred embodiment is implemented using one or more computer programs running on a network element such as a router device. Thus, in this embodiment, the computer system 1000 is a router.

Computer system 1000 includes a bus 1002 or other communication mechanism for communicating information, and a processor 1004 coupled with bus 1002 for processing information. Computer system 1000 also includes a main memory 1006, such as a random access memory (RAM), flash memory, or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk, flash memory or optical disk, is provided and coupled to bus 1002 for storing information and instructions.

A communication interface 1018 may be coupled to bus 1002 for communicating information and command selections to processor 1004. Interface 1018 may be a conventional serial interface such as an RS-232 or RS-422 interface. An external terminal 1012 or other computer system connects to the computer system 1000 and provides commands to it using the interface 1018. Firmware or software running in the computer system 1000 provides a terminal interface or character-based command interface so that external commands can be given to the computer system. In an embodiment, communication interface 1018 also provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

A switching system 1016 is coupled to bus 1002 and has an input interface 1014 and an output interface 1019 to one or more external network elements. The external network elements may include a local network 1022 coupled to one or more hosts 1024, or a global network such as Internet 1028 having one or more servers 1030. The switching system 1016 switches information traffic arriving on input interface 1014 to output interface 1019 according to pre-determined protocols and conventions that are well known. For example, switching system 1016, in cooperation with processor 1004, can determine a destination of a packet of data arriving on input interface 1014 and send it to the correct destination using output interface 1019. The destinations may include host 1024, server 1030, other end stations, or other routing and switching devices in local network 1022 or Internet 1028.

According to one embodiment, compliance management is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 1004 for execution. Such a medium may take many forms, including but not limited to, non-transitory and non-volatile storage media and non-transitory volatile storage media. Non-volatile storage media includes, for example, optical or magnetic disks, such as storage device 1010. Volatile storage media includes dynamic memory, such as main memory 1006.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for compliance management as described herein. The received code may be executed by processor 1004 as it is received, and/or stored in storage device 1010, or other non-volatile storage for later execution.

7.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. An apparatus, comprising:
   one or more processors;
   a computer-readable storage medium comprising one or more stored sequences of instructions which, when executed by the one or more processors, cause the one or more processors to perform:
      generating relationship information based on relationships between two or more events that are generated by one or more managed systems;
      sending the relationship information to one or more of the managed systems;
      wherein the relationship information is configured to allow the one or more managed systems to determine, based on the relationships between the two or more events, whether reporting of the two or more events, by the one or more managed systems, should be suppressed;
      receiving, from one of the managed systems, a report about an event, from the two or more events, when reporting of the event cannot be suppressed.

2. The apparatus of claim 1, further comprising instructions which, when executed, cause updating the relationship information based on updated relationships between the two or more events that are generated by the one or more managed systems.

3. The apparatus of claim 1, wherein the relationship information is generated for a first event and a second event and corresponds to a relationship between the first event and the second event.

4. The apparatus of claim 1, further comprising instructions which, when executed, cause generating one or more event reporting modes that are associated with the two or more events, and sending, to the one or more managed systems, the one or more event reporting modes.

5. The apparatus of claim 1, further comprising instructions which, when executed, cause generating one or more event enable-disable characteristics that are associated with the two or more events, and sending, to the one or more managed systems, the one or more event enable-disable characteristics.

6. The apparatus of claim 1, further comprising instructions which, when executed, cause generating one or more event asynchronous-synchronous characteristics that are associated with the two or more events, and sending, to the one or more managed systems, the one or more event asynchronous-synchronous characteristics.

7. A non-transitory computer-readable storage medium storing one or more sequences of instructions which, when executed by one or more processors, cause the one or more processors to perform:
   generating relationship information based on relationships between two or more events that are generated by one or more managed systems;
   sending the relationship information to one or more of the managed systems;
   wherein the relationship information allows the one or more managed systems to determine, based on the relationships between the two or more events, whether reporting of the two or more events, by the one or more managed systems, should be suppressed;
   receiving, from one of the managed systems, a report about an event, from the two or more events, when reporting of the event cannot be suppressed.

8. The computer-readable storage medium of claim 7, further comprising instructions which, when executed, cause updating the relationship information based on updated relationships between the two or more events that are generated by the one or more managed systems.

9. The computer-readable storage medium of claim 7, wherein the relationship information is generated for a first event and a second event and corresponds to a relationship between the first event and the second event.

10. The computer-readable storage medium of claim 7, further comprising instructions which, when executed, cause generating one or more event reporting modes that are associated with the two or more events, and sending, to the one or more managed systems, the one or more event reporting modes.

11. The computer-readable storage medium of claim 7, further comprising instructions which, when executed, cause generating one or more event enable-disable characteristics that are associated with the two or more events, and sending, to the one or more managed systems, the one or more event enable-disable characteristics.

12. The computer-readable storage medium of claim 7, further comprising instructions which, when executed, cause generating one or more event asynchronous-synchronous characteristics that are associated with the two or more events, and sending, to the one or more managed systems, the one or more event asynchronous-synchronous characteristics.

13. A method comprising:
   generating relationship information based on relationships between two or more events that are generated by one or more managed systems;
   sending the relationship information to one or more of the managed systems;
   wherein the relationship information allows the one or more managed systems to determine, based on the relationships between the two or more events, whether reporting of the two or more events, by the one or more managed systems, should be suppressed;
   receiving, from one of the managed systems, a report about an event, from the two or more events, when reporting of the event cannot be suppressed;
   wherein the method is performed by one or more processors.

14. The method of claim 13, further comprising updating the relationship information based on updated relationships between the two or more events that are generated by the one or more managed systems.

15. The method of claim 13, wherein the relationship information is generated for a first event and a second event and corresponds to a relationship between the first event.

16. The method of claim 13, further comprising generating one or more event reporting modes that are associated with the two or more events, and sending, to the one or more managed systems, the one or more event reporting modes.

17. The method of claim 13, further comprising generating one or more event enable-disable characteristics that are associated with the two or more events, and sending, to the one or more managed systems, the one or more event enable-disable characteristics.

18. The method of claim 13, further comprising generating one or more event asynchronous-synchronous characteristics that are associated with the two or more events, and sending, to the one or more managed systems, the one or more event asynchronous-synchronous characteristics.

19. An apparatus, comprising:
one or more processors;
a computer-readable storage medium storing one or more sequences of instructions which, when executed by the one or more processors, cause the one or more processors to perform:
receiving relationship information from one or more external management systems, wherein the relationship information captures relationships between two or more events and allows to determine, based on the relationships between the two or more events, whether reporting of the two or more events should be suppressed;
receiving an indication that an event was generated, wherein the event has associated one or more characteristics;
reporting the event to one or more of the one or more external management systems when reporting of the event cannot be suppressed.

20. The apparatus of claim 19, further comprising instructions which, when executed, cause identifying one or more relationships between the event and the two or more events.

21. The apparatus of claim 19, further comprising instructions which, when executed, cause identifying one or more event reporting modes that are associated with the event.

22. The apparatus of claim 19, further comprising instructions which, when executed, cause identifying one or more event enable-disable characteristics that are associated with the event.

23. The apparatus of claim 19 further comprising instructions which, when executed, cause identifying one or more event asynchronous-synchronous characteristics that are associated with the event.

* * * * *